(No Model.)
H. H. GRIDLEY.
MEANS FOR DISTRIBUTING FERTILIZERS.
No. 563,921. Patented July 14, 1896.
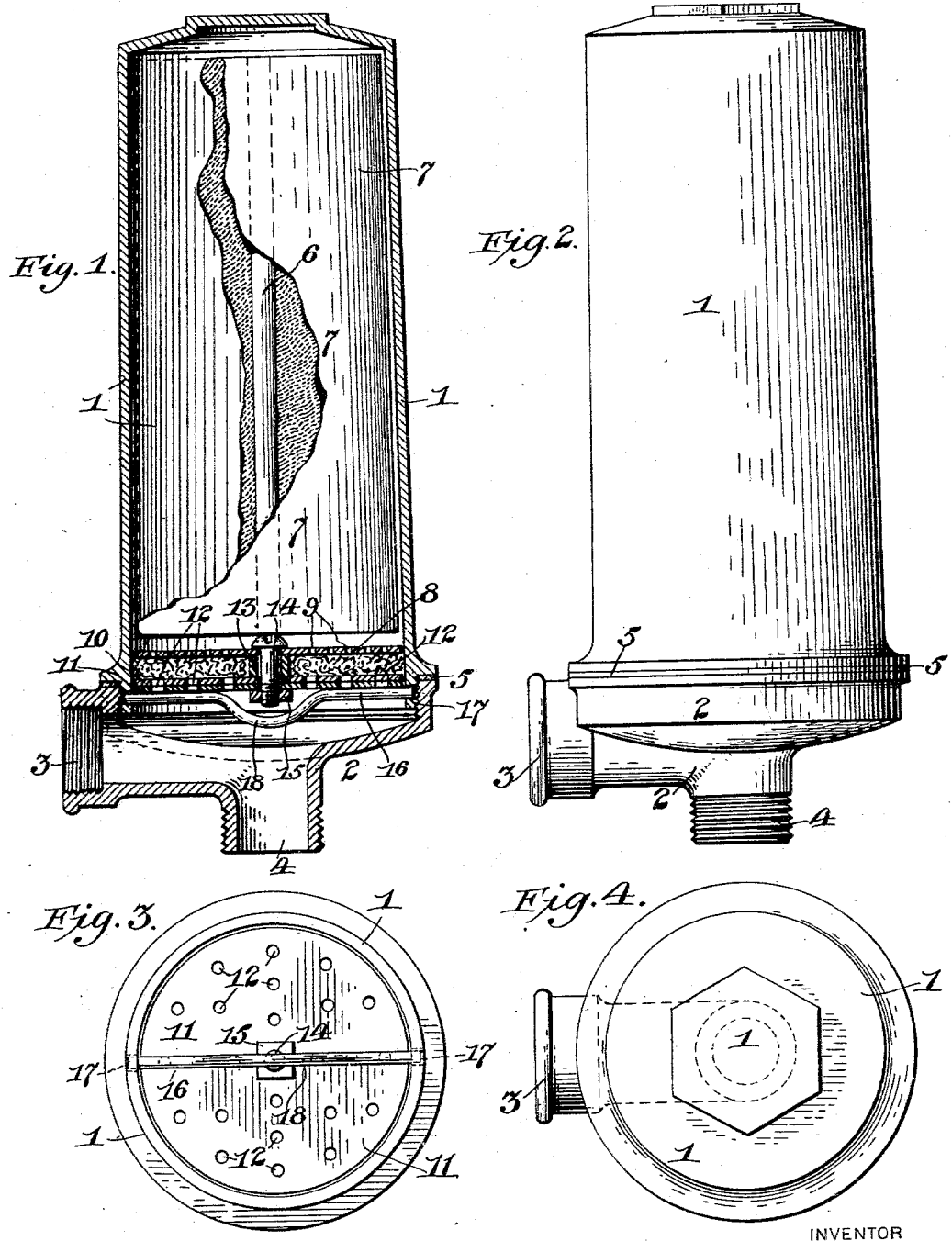
WITNESSES
Severance
Olia F. Johnson
INVENTOR
Henry H. Gridley
By Francis M. Wright
Attorney.
THE NORRIS PETERS CO., PHOTO-LITHO., WASHINGTON, D. C.

UNITED STATES PATENT OFFICE.

HENRY H. GRIDLEY, OF SPRINGFIELD, MASSACHUSETTS.

MEANS FOR DISTRIBUTING FERTILIZERS.

SPECIFICATION forming part of Letters Patent No. 563,921, dated July 14, 1896.

Application filed June 26, 1895. Serial No. 554,108. (No model.)

*To all whom it may concern:*

Be it known that I, HENRY H. GRIDLEY, a citizen of the United States, residing at Springfield, in the county of Hampden and State of Massachusetts, have invented certain new and useful Means for Distributing Fertilizers, of which the following is a specification.

My invention relates to an improved method of and means for distributing fertilizers or analogous substances, and in pursuance of the objects of my invention I have devised, first, a novel method of distributing fertilizers whereby the fertilizer having been transported in a compact and solid form to the place where it is to be used, can be dissolved and distributed by means of a current of water, as through a hose-pipe, such solution and consequent distribution taking place at a practically uniform rate until the whole quantity supplied at one time has been exhausted. Furthermore I have devised novel apparatus whereby the above process can be conveniently carried out, and, yet further, I have devised, as a new article of manufacture, a novel form in which the fertilizer can be so carried in a solid body, as required, in my above-mentioned method.

In the accompanying drawings, Figure 1 is a vertical section of the improved apparatus which I have devised as aforesaid, disclosing also, located in the air-chamber thereof, the said novel article of manufacture, namely, a cylinder of fertilizing material compressed around a slender rod of wood or other insoluble material, the cylinder being broken away to show the wooden core. Fig. 2 is a side elevation of the same. Fig. 3 is a bottom plan view of the apparatus, the pipe portion being removed; and Fig. 4 is a top plan view of the whole device.

1 represents the receptacle for the fertilizer, being closed at the top and sides and open only at the bottom. Upon the bottom is secured the pipe portion 2, having the inlet-pipe 3 and the outlet-pipe 4. A suitable washer 5 is interposed between the fertilizer-receptacle and the pipe portion.

One form in which I may use the fertilizer within the receptacle is in that of its usual commercial condition of granular crystals, somewhat like rock-salt. Another form is that shown in Fig. 1, in which 6 is a rod of wood or other insoluble material, and 7 represents the fertilizing material compressed into a compact cylindrical form around the rod 6. In whatever form be the fertilizing material it is retained in the receptacle by means of the double filter shown, in which 8 represents the upper screen, provided with perforations 9, and 10 11 represent the two lower screens, provided with perforations 12. Between the upper and lower screens is interposed the collar 13, whereby an intermediate space is formed which is filled with sponge or other suitable filtering material. The sponge arrests all large particles of the fertilizing-crystals and retains them until dissolved by the stream of water. The upper and lower screens are held together by the bolt 14 and nut 15.

In order to adjust the quantity of water admitted through the perforations 12, the screens 10 11 may be turned relatively to each other about their common center, so as to vary the degree in which the perforations in the two plates or screens register with each other, and the plates may then be secured in position by screwing the nut 15 upon the bolt 14 and so tightening the screens upon each other. When the complete filter or screen has thus been put together, it is retained in place in the mouth of the receptacle by means of a stout wire 16, the ends of which are inserted in holes 17 in the sides of the cylinder, and which has its middle portion bent, as at 18, so as to enable it to be slid in either direction out of one of the holes to remove it when desired.

Such being the construction of the apparatus, the operation is as follows: The receptacle having been filled with the fertilizing material, either in the form of crystals or of a compressed cylinder having a central insoluble core, the screens, pipe portion, hose-pipe, and spraying device being secured in place, the flow of water being turned on, the water ascends in the receptacle 1 by reason of the back pressure from the nozzle and commences to dissolve the lower portion of the fertilizing material. The height to which the water can rise in the chamber 1 is, however, limited by the pressure of the air inclosed in said chamber. Thus the pressure of the air confined in the chamber resists the rise of the water in the chamber, and thus equalizes to a very considerable extent the rate of solution and distribution of the crystallized fertilizing material much more than if the water were permitted to flow freely through it, since the water is admitted only as it takes the place of the dissolved and discharged fertilizing material.

When it is desired to still further equalize the rate of distribution, I furnish the fertilizing material in the form of a cylinder compressed about a rod of wood or other insoluble material. The material upon this rod is dissolved first at the lowest portions and then as the water rises it progressively attacks the upper portions, leaving, however, even to the last, the uppermost portion supported by the wooden core, so that the uppermost portion is not attacked until the lower portions have been dissolved. The object of this portion of my invention is to maintain an even rate of solution, the proportion which I find to be advantageous being for fertilizing-salts one pound to four barrels of water, and for insecticides, as paris-green, one pound to eight barrels of water.

Having thus fully described my invention, what I claim, and desire to secure by Letters Patent, is—

In a holder for soluble fertilizers, the combination of a receptacle for fertilizer, open at one end, a sieve across said open end, and an insoluble core for the fertilizing material supported at its end on said sieve within said receptacle, substantially as described.

In witness whereof I have hereunto set my hand in the presence of two witnesses.

HENRY H. GRIDLEY.

Witnesses:
    RALPH W. ELLIS,
    EMBURY P. CLARK.